(12) United States Patent
Shin et al.

(10) Patent No.: US 9,729,305 B2
(45) Date of Patent: Aug. 8, 2017

(54) AIRPLANE SYSTEM AND CONTROL METHOD THEREOF

(71) Applicant: Electronics and Telecommunications Research Institute, Daejeon (KR)

(72) Inventors: Chang Min Shin, Daejeon (KR); Tae Ho Kim, Gunpo (KR); Chae Deok Lim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 86 days.

(21) Appl. No.: 14/612,218

(22) Filed: Feb. 2, 2015

(65) Prior Publication Data
US 2015/0256321 A1  Sep. 10, 2015

(30) Foreign Application Priority Data
Mar. 4, 2014  (KR) .................. 10-2014-0025488

(51) Int. Cl.
| | |
|---|---|
| *H04L 12/703* | (2013.01) |
| *H04L 5/14* | (2006.01) |
| *H04W 56/00* | (2009.01) |
| *B64D 47/00* | (2006.01) |

(52) U.S. Cl.
CPC .............. *H04L 5/14* (2013.01); *H04W 56/00* (2013.01); *B64D 47/00* (2013.01)

(58) Field of Classification Search
None
See application file for complete search history.

(56) References Cited

U.S. PATENT DOCUMENTS

| | | | |
|---|---|---|---|
| 6,683,848 B1 * | 1/2004 | Parrish | H04J 3/0688 370/218 |
| 7,584,032 B2 | 9/2009 | Bauman et al. | |

FOREIGN PATENT DOCUMENTS

| | | |
|---|---|---|
| KR | 10-2003-0004307 A | 1/2003 |
| KR | 10-2013-0067454 A | 6/2013 |
| KR | 10-2013-0107412 A | 10/2013 |
| SE | 00/00325 * | 2/2000 |
| WO | WO 00/50995 A1 | 8/2000 |
| WO | WO 01/42933 A1 | 6/2001 |

* cited by examiner

Primary Examiner — Fan Ng

(57) ABSTRACT

Disclosed are an airplane system including duplex modules, and a control method thereof. The control method of the airplane system includes: receiving, by each of a plurality of duplex modules, a corresponding event command from a client; performing, by a first module, a first event specified by the event command in response to the event command; performing, by a second module different from the first module, a second event specified by the event command after the first event is completed; and returning a first response signal indicating a result of the performance of the first event and a second response signal indicating a result of the performance of the second event to the client, in which the client compares the first response signal and the second response signal, and determines whether the plurality of duplex modules is synchronized or has an error.

9 Claims, 5 Drawing Sheets

AIRPLANE SYSTEM AND CONTROL METHOD THEREOF

CROSS-REFERENCE TO RELATED APPLICATIONS

This application is based on and claims priority from Korean Patent Application No. 10-2014-0025488, filed on Mar. 4, 2014, with the Korean Intellectual Property Office, the disclosure of which is incorporated herein in its entirety by reference.

BACKGROUND

1. Field

The present invention relates to an airplane system and a control method thereof, and more particularly, to an airplane system including duplex modules so as to improve reliability and stability of the airplane system, and a control method thereof

2. Discussion of Related Art

An Integrated Modular Avionics (IMA) technology is used in an airplane system. The IMA is a technology for improving safety and efficiency of a system including many application having different safety levels, and prevents an application and hardware from being interfered from each other when the application and the hardware are developed or executed, thereby decreasing development cost of the hardware or the application. Particularly, the IMA may be applied to an avionics software standard, such as ARINC-653, in an airplane system.

Aeronautical Radio Incorporate (ARINC) is a nonprofit organization of the US, and defines standards of a communication service between a terrestrial base station and an air plane, and an avionics standard. ARINC-653 is one of the standards defined by the ARINC, and is a technology standard between an operating system of an airplane system and an application program operated in the operating system for the IMA.

ARINC-653 regulates a plurality of partitions in an airplane system including the large number of application programs and processes. The purpose of the partition is to make each application be more efficiently operated, and the partition is present in the form of a process in a user layer, and scheduling is performed through the partition by using data having information on the partition in a kernel layer.

In the meantime, the airplane system requires high reliability and stability due to its characteristic. Further, in the airplane system, some constituent elements are often formed in a duplex system in order to secure reliability and stability. However, an airplane system in the related art is not configured so as to be appropriate the duplex system under the ARINC-653. Accordingly, efficiency deteriorates, so that an airplane system optimized to the duplex system has been demanded.

SUMMARY

The present invention has been made in an effort to provide an airplane system performing a monitoring or debugging method optimized to a duplex system, and a control method thereof The present invention has been made in an effort to provide an airplane system for efficiently performing synchronization between duplex modules, and effectively discriminating operation errors of the duplex modules in a monitoring or debugging method of the airplane system, and a control method thereof An exemplary embodiment of the present invention provides a control method of an airplane system, including: receiving, by each of a plurality of duplex modules, a corresponding event command from a client; performing, by a first module among the plurality of duplex modules, a first event specified by the event command in response to the event command; performing, by a second module different from the first module among the plurality of duplex modules, a second event specified by the event command after the first event is completed; and returning a first response signal indicating a result of the performance of the first event and a second response signal indicating a result of the performance of the second event to the client, in which the client compares the first response signal and the second response signal, and determines whether the plurality of duplex modules is synchronized or has an error.

The first module may be a master module first operated among the plurality of duplex modules, and the second module may be a slave module replacing the first module when the first module has failure.

The first event may be a monitoring operation or a debugging operation performed by the first module, and the second event may be a monitoring operation or a debugging operation performed by the second module.

The performing of the first event may include providing, by the first module, a synchronization request to a memory unit after the first event is performed.

The memory unit may toggle or change a value of a flag stored in the memory unit in response to the synchronization request.

The performing of the second event may include: performing the second event in response to the toggle or the change of the value of the flag; and providing, by the second module, another synchronization request discriminated from the synchronization request to the memory unit after the second event is performed.

The memory unit may toggle or change a value of the flag stored in the memory unit again in response to another synchronization request.

The event command may be transmitted to each of the plurality of duplex modules in a form of a packet.

The first response signal and the second response signal may be returned to the client in a form of a packet.

The event command may include an identifier for the corresponding duplex module.

The identifier may be included in the first response signal or the second response signal to be returned to the client.

Another exemplary embodiment of the present invention provides an airplane system, including: a client; a first module configured to receive a first event command from the client, perform a first event in response to the first event command, and return a result of the performance of the first event to the client as a first response signal; and a second module configured to receive a second event command from the client, perform a second event in response to the second event command, and return a result of the performance of the second event to the client as a second response signal, in which the client compares the first response signal and the second response signal, and determines whether the first module and the second module are synchronized or have errors.

The airplane system may further include a memory unit configured to store a synchronization flag used in the synchronization of the first module and the second module.

The first module may provide a synchronization request to the memory unit so that a value of the synchronization flag is toggled or changed after the performance of the first event, and the second module may perform the second event in response to the toggle or the change of the synchronization flag.

According to the exemplary embodiments of the present invention, it is possible to provide the monitoring method and the debugging method optimized to the airplane system configured in the duplex system.

Further, the synchronization between the duplex modules may be effectively performed, and an erroneous operation of each of the duplex modules may be effectively discriminated during the monitoring or the debugging of the airplane system.

Further, it is possible to improve reliability and stability of the airplane system by effectively supporting the duplex system of the airplane.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Figure 1:
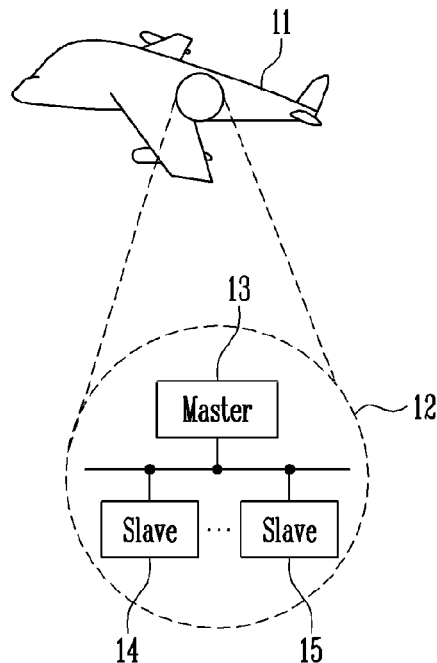
FIG. 1 is a diagram schematically illustrating an airplane system according to an exemplary embodiment of the present invention.

The present invention will be described with reference to the accompanying drawings based on a specific embodiment in which the present invention may be carried out as an example. It should be understood that various embodiments of the present invention are different from each other, but need not to be mutually exclusive. For example, a specific figure, a structure, and a characteristic described herein may be implemented as another embodiment without departing from a spirit and a scope of the present invention in relation to an embodiment.

Further, it should be understood that a position or a displacement of an individual constituent element in each disclosed embodiment may be changed without departing from the spirit and the scope of the present invention. Accordingly, the detailed description below is not intended as a limit meaning, and the scope of the present invention is defined by the accompanying claims in principle, and includes the matters described in the claims and exemplary embodiments within an equivalent scope thereto. When like reference numerals are used in the drawings, the like reference numerals denote the same or similar functions in several exemplary embodiments.

Hereinafter, contents and a spirit of the present invention will be described through a particular exemplary embodiment with reference to the accompanying drawings.

FIG. 1 is a diagram schematically illustrating an airplane system according to an exemplary embodiment of the present invention. Referring to FIG. 1, an airplane system 100 includes a duplex system 12 embedded in an airplane 11.

The duplex system 12 is a system formed by overlapping main modules in duplex or more in order to secure reliability and stability of the airplane system 10, and when any one of the main modules is abnormally operated, the standby remaining modules replace the abnormal module within a short time to make the system be normally operated.

For example, it is assumed that the duplex system 12 is duplicated in triple. In this case, the duplex system 12 includes one master unit 13 capable of performing the same function, and two slave units 14 and 15. Under the normal operation, a main function of the duplex system 12 is performed by the master unit 13. The slave units 14 and 15 may be in a standby state, perform other subsidiary functions, or following the master unit 13 and performing the same operation as that of the master unit 13 during an operation of the master unit 13. However, during the normal operation of the master unit 13, the slave units 14 and 15 do not interfere in the function of the master unit 13 or do not appear on a surface of the airplane system 10.

In the meantime, when the master unit 13 is abnormally operated due to a problem or other errors, the master unit 13 is replaced with at least one of the slave units 1 and 15 for the normal operation of the airplane system 12. The function of the master unit 13 is transferred to the slave units 14 and 15, and the airplane system 10 stably maintains its function while depending on the operations of the slave units 14 and 15.

As an exemplary embodiment, when the master unit 13 is abnormally operated, the function of the master unit 13 may be primarily transferred to the first slave unit 14. In this case, the second slave unit 15 is a duplex module prepared for a problem of the first slave unit 14, and when the first slave unit 14 is abnormally operated, the function of the first slave unit 14 is transferred to the second slave unit 15 again.

As an exemplary embodiment, the airplane system 10 is based on the ARINC-653 standard, and the duplex system 12 may be operated by an operating system based on the ARINC-653 standard.

In the above, a general method and a principle of the duplex system 12 of the airplane system 100 have been described. Hereinafter, a particular operation method and configuration of the duplex system 12 performing monitoring and debugging on the airplane system 10 will be described.

Figure 2:
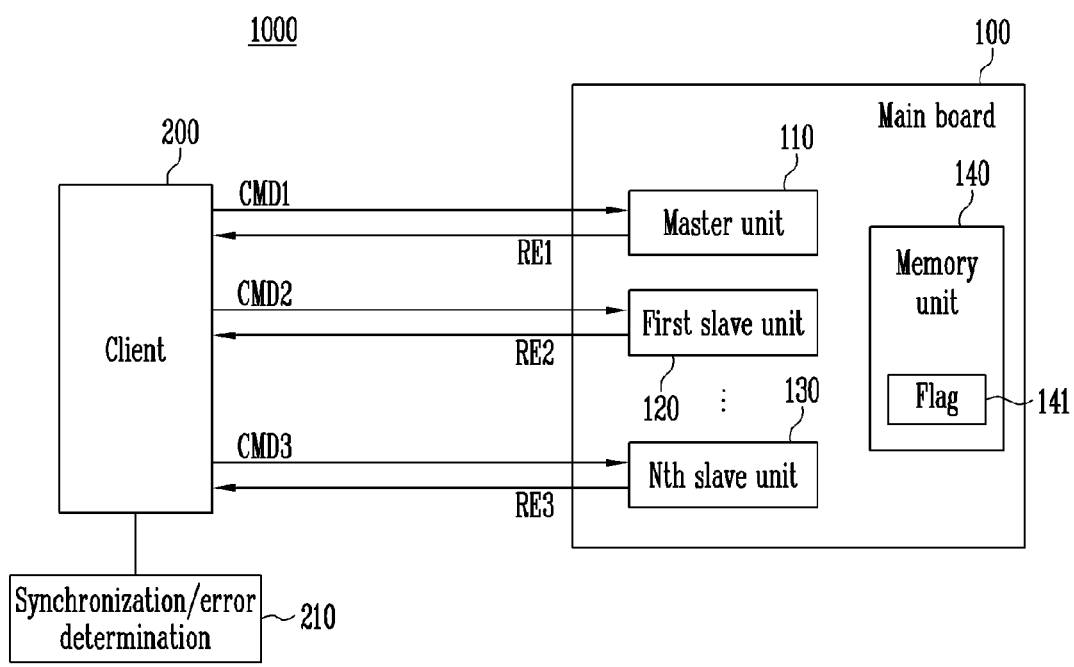
FIG. 2 is a block diagram illustrating an example of an airplane system configured in a duplex system according to an exemplary embodiment of the present invention.

FIG. 2 is a block diagram illustrating an example of a computer device formed in a duplex system in an airplane system according to an exemplary embodiment of the present invention. Referring to FIG. 2, an airplane system 1000 includes a computer device 100 and a client device 200 formed in a duplex system.

The computer device 100 includes a plurality of duplex modules 110, 120, and 130 capable of performing the same operation or similar operations. In this case, the operations performed by the duplex modules 110, 120, and 130 may be a monitoring operation or a debugging operation for the airplane system 1000. Each of the plurality of duplex modules 110, 120, and 130 may independently interface with the client 200. The duplicate modules 110, 120, and 130 receive monitoring commands or debugging commands CMD1, CMD2, and CMD3 from the client 200, respectively, and perform the monitoring or debugging operation according to the received commands CMD1, CMD2, and CMD3, and then convert response signals RE1, RE2, and RE3 indicating operation performance results to the client device 200, respectively.

FIG. 2 illustrates the three duplex modules 110, 120, and 130, which are, however, examples, and the scope of the present invention is not limited thereto. For example, the computer device 100 may be configured to include four or more duplex modules, and include only two duplex modules. The computer device 100 further include a memory unit 140 which each of the plurality of duplex modules 110, 120, and 130 is accessible. The memory unit 140 may store one or more flags (synchronization flags) referred for synchronization of the plurality of duplex modules 110, 120, and 130. As one exemplary embodiment, the plurality of duplicate modules 110, 120, and 130, and the memory unit 141 may be embedded in one main board.

The client 200 transmit the monitoring commands or the debugging commands CMD1, CMD2, and CMD3 to the computer device 100, receives the performance results RE1, RE2, and RE3 according to the commands CMD1, CMD2, and CMD3 from the computer device 100, and determines whether the monitoring commands or the debugging commands are properly performed, and the plurality of duplex modules 110, 120, and 130 are properly synchronized (210). When the synchronization between the duplex modules 110, 120, and 130 is not property performed, an operation of any one of the duplex modules 110, 120, and 130 cannot be successfully replaced by another one, so that whether the respective duplex modules 110, 120, and 130 are synchronized is important for the stable operation of the airplane system 1000.

An operation of the computer device 100 and the client 200 will be described in more detail below.

The monitoring operation is initiated by generating a command indicating any one of several monitoring operations as a packet, and transmitting the generated packets CMD1, CMD2, and CMD3 to the duplex modules 110, 120, and 130 of the computer device 100.

As an exemplary embodiment, when the client 200 individually generates the packets CMD1, CMD2, and CMD3 for the duplex modules 110, 120, and 130, respectively, when generating the packets, and each of the packets CMD1, CMD2, and CMD3 includes an identifier for describing each packet.

The duplex modules 110, 120, and 130 perform the monitoring on the airplane system 1000 according to the received packets CMD1, CMD2, and CMD3. The monitoring operations of the duplex modules 110, 120, and 130 are performed in a real time operating system (based on the ARINC-653 standard) of the computer device 100. For example, when a specific application is performed in the operating system of the computer device 100, and the computer device 100 receives the pre-defined monitoring commands CMD1, CMD2, and CMD3 from the client 200, the computer device 100 temporarily stops the current application and the like, and performs the monitoring operation of reading contents of the memory, or recording a specific value in a position of the memory according to the commands CMD 1, CMD2, and CMD3 in that state. The monitoring operation is performed by the individual duplex modules 110, 120, and 130 in duplicate, and the monitoring operations of the duplex modules 110, 120, and 130 are synchronized during the process.

After performing the requested monitoring operations, the duplex modules 110, 120, and 130 generate the response signals RE1, RE2, and RE3 including the identifiers, which are included in the command or packets CMD1, CMD2, and CMD3, respectively. The response signals RE1, RE3, and RE3 are transmitted to the client 200 from the duplex modules 110, 120, and 130. The client 200 determines a duplex module, which transmits each of the response signals RE1, RE2, and RE3, among the duplex modules 110, 120, and 130 by using the identifiers included in the received response signals, compares the received response signals RE1, RE2, and RE3, and determines whether the duplex modules 110, 120, and 130 are synchronized and are normally operated. For example, when the response signals RE1, RE2, and RE3 have the same value, the client 200 determines that the duplex modules 110, 120, and 130 are normally synchronized. By contrast, when the response signals RE1, RE2, and RE3 have different values, the client 200 determines that the duplex modules 110, 120, and 130 are abnormally synchronized or the computer device 100 or the duplex modules 110, 120, and 130 have a specific problem.

In the meantime, a series of operations of receiving, by the duplex modules 110, 120, and 130, the command or the packets CMD1, CMD2, and CMD2, and performing the monitoring operations, and returning the response signals according to the results of the performance, and the synchronization method will be described in more detail.

Data transmission between the client 200 and the computer device 100 is performed by using a communication means, which is widely known in the art, such as Ethernet and a communication serial.

The aforementioned monitoring operation of the computer device 100 or the duplex modules 110, 120, and 130 may be a part of the debugging operation. For example, when it is determined that an error is generated according to the result of the monitoring operation, the computer device 100 may perform necessary debugging on the computer device 100 or the airplane system 1000.

As an exemplary embodiment, the computer device 100 and the client 200 may be configured of a plurality of modules embedded in the same hardware, or a plurality of computers independent in hardware.

According to the aforementioned configuration, the monitoring method and the debugging method optimized to the airplane system configured in the duplex system are provided. Further, the synchronization between the duplex modules may be effectively performed, and an erroneous operation of each of the duplex modules may be effectively discriminated during the monitoring or the debugging of the airplane system. Further, it is possible to improve reliability and stability of the airplane system by effectively supporting the duplex system of the airplane.

Figure 3:
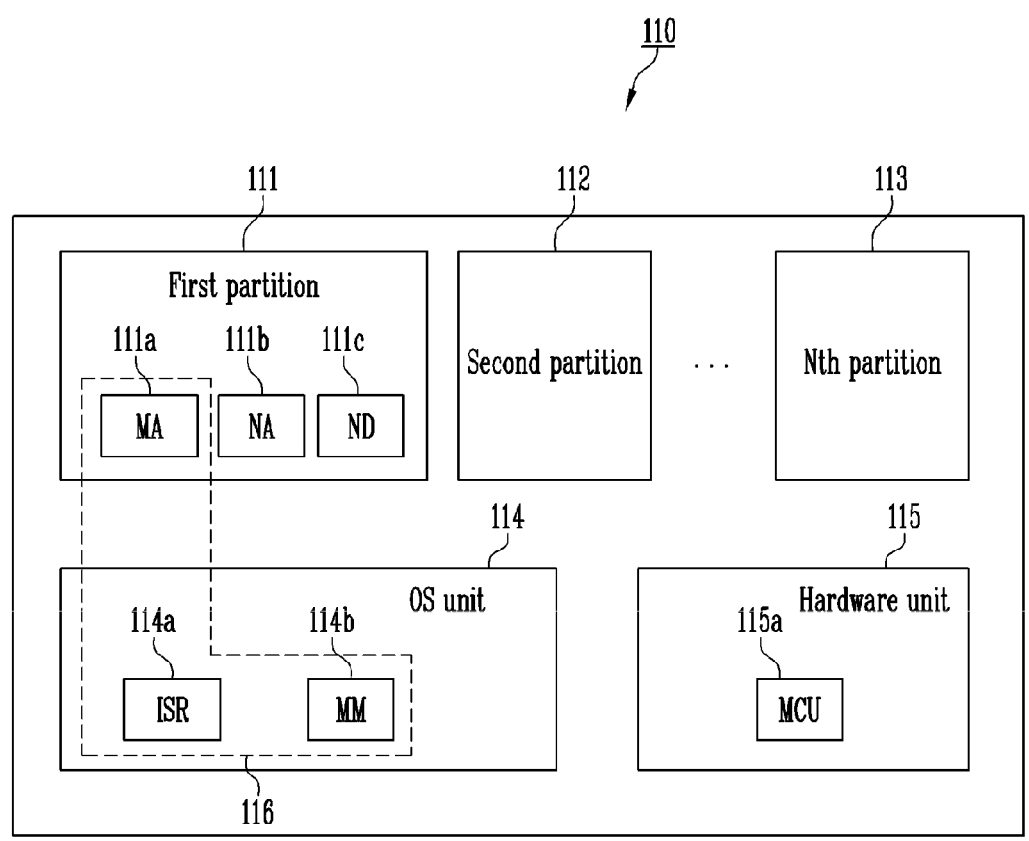
FIG. 3 is a block diagram illustrating an example of a particular configuration of a master unit of FIG. 1.

FIG. 3 is a block diagram illustrating an example of a particular configuration of the master unit of FIG. 1. Referring to FIG. 3, the master unit 110 includes a plurality of partitions 111, 112, and 113, an operating system unit 114, and a hardware unit 115. The master unit 110 is a computing module based on the ARINC-653 standard as described above, and performs the monitoring operation and the debugging operation for the computer device 100 (see FIG. 2) or the airplane system 1000 (see FIG. 2).

In the meantime, each of the plurality of partitions 111, 112, and 113 may be configured in the same structure or similar structures. Accordingly, only the first partition 111 will be described below.

The first partition 111 includes a Monitoring Agent 111a (hereinafter, referred to as an MA), a Network Agent 111b (hereinafter, referred to as an NA), and a Network Driver 111c (hereinafter, referred to as an ND).

The MA 111a is a configuration of generating a system call for processing a command received from an external system. Particularly, the MA 111a generates a system call internally implemented for obtaining monitoring information according to a monitoring command requested from the external system (for example, the client 200, see FIG. 2) to obtain the necessary monitoring information from a debugging management component existing in the operating system, and returns the obtained monitoring information to the external system through a network.

The NA 111b is a configuration transmitting and receiving the monitoring command or the monitoring result, and the NA 111b receives the monitoring command (for example, CMD1 of FIG. 2) from the external system, and transmits the received command to the MA 111a. Further, the NA 111b receives the monitoring result from the MA 111a, generates a response signal (for example, RE1 of FIG. 1) based on the received monitoring result, and then transmits the generated response signal to the external system.

The ND 111c is a network driver of the computer device 100, and contributes to data transmission/reception between the computer device 100 and the external system. For example, the ND 111c may be a driver of the Ethernet or the serial communication.

The operating system unit 114 includes an Interrupt Service Routine 114a (hereinafter, referred to as an ISR), and a Monitoring Manager 114 (hereinafter, referred to as an MM).

The ISR 114a is a processing routine when a specific event related to interruption is generated.

The MM 114b directly performs the monitoring operation. For example, the MM 114b accesses the memory or a resister of a target system (for example, the computer device 100, see FIG. 2) for the monitoring according to the system call of the MA 111a, obtains specific data, and then returns the result of the obtainment to the MA 111a.

The hardware unit 115 includes computing elements configuring physical hardware of the master unit 110. For example, the hardware unit 115 includes a Micro Control Unit 115a (hereinafter, referred to as an MCU).

The MCU 115a is a dedicated processor for controlling the master unit 110, and is configured in a non-memory semiconductor controlling various functions of the master unit 110. The MCU 115a may embed software dedicatedly designed so as to be appropriate to performance of a specific function.

In the meantime, the MA 111a, the ISR 114a, and the MM 114b may configure one monitoring unit 116.

Hereinafter, the monitoring operation of the master unit 110 will be described in detail with reference to the configuration illustrated in FIG. 3.

The monitoring operation may include a plurality of detailed operations. For example, the monitoring operation may include a break point operation, a trigger operation, an execution flow control operation, a memory read and write operation, a register read and write operation, a snapshot operation, and a cycle operation.

Here, the break point operation is an operation of setting or releasing a break point at a position requested by the external system (for example, the client 200) in order to read from the memory or write data in the memory of the target system (for example, the computer device 100) in which the operating system based on the ARINC-653 standard is executed. The break point operation is performed by using an Instruction Address Breakpoint Resister (IABR) and a Data Address Breakpoint Register (DABR). Particular contents for the IABR and the DABR are widely known to the art, so descriptions thereof will be omitted.

The trigger operation is an operation of, after the break point is set, executing a specific function and event according to a predetermined condition in response to the setting.

The execution flow control operation is an operation for controlling process execution flows of the specific partitions (for example, the partitions 111, 112, and 113). The execution flow control operation includes an operation for operating, stopping, and promptly executing a process of a specific partition, or an operation for executing a specific stage in the series of sequences.

The memory read and write operation is an operation of accessing a memory of a target system, and recording or reading data.

The register read and write operation is an operation of accessing a register of a target system, and recording or reading data.

The snapshot operation is an operation of dumping and reading values of specific variables among data in a memory of a target system, in which the operating system based on the ARINC-653 standard is performed, by a snapshot method.

The cycle operation is an operation of repeatedly recording a predetermined value in a specific memory address according to repeated generation of a specific event (for example, a timer event) from an external system. For example, the master unit 110 may periodically increase a value of the specific variable by every 1 whenever an event for an application is generated through the cycling operation.

A general flow of the monitoring operation will be described below.

First, the client 200 transmits the CMB1 requesting the monitoring to the master unit 110 through a communication means (for example, Ethernet or the serial). The ND 11c and NA 111b of the master unit 110 receive a packet from the client 200, extract the monitoring command included in the packet, and transmit the extracted monitoring command to the MA 111a. The MA 111a interprets the monitoring command, determines a specific operation requested by the client 200 among the detailed operations of the monitoring (for example, the break point operation, the trigger operation, the execution flow control operation, the memory read and write operation, the register read and write operation, the snapshot operation, and the cycle operation), and generates a system call so that the MM 114b performs the detailed operation requested by the client 200 according to a result of the determination.

The MM 114b performs the monitoring detailed operation according to the generated system call, and returns the result to the MA 111a. The MA 111a transmits the received result to the NA 111b, and the NA 111b and the ND 111c transmit a performance result of the command requested by the client 200 to the client 200 as the response signal RE1 by referring to the received result. In this case, the response signal RE1 may be configured in the form of a packet. The transmitted response signal RE1 is used for identifying, by the client 200, whether the computer device 100 or the duplex modules 110, 120, and 130 are synchronized and have an error.

In the meantime, only the configuration of the master unit 110 has been described, but the slave units 120 and 130 (see FIG. 2), which are not described here) may be configured to be the same as or similar to the configuration of the master unit 110 described with reference to FIG. 3 so as to perform the same or similar function (for example, the monitoring function and the debugging function) as or to that of the master unit 110.

That is, the slave units 120 and 130 are modules for replacing the master unit 110 in preparation of the problem or failure of the master unit 110, so that each of the slave units 120 and 130 includes the same configuration as the aforementioned configuration of the master unit 110. However, the particular configurations of the slave units 120 and 130 may be modified or changed so as to be partially different from the master units 120 and 130 according to a technical common sense of those skilled in the art within a range without departing from the spirit of the present specification.

Figure 4:
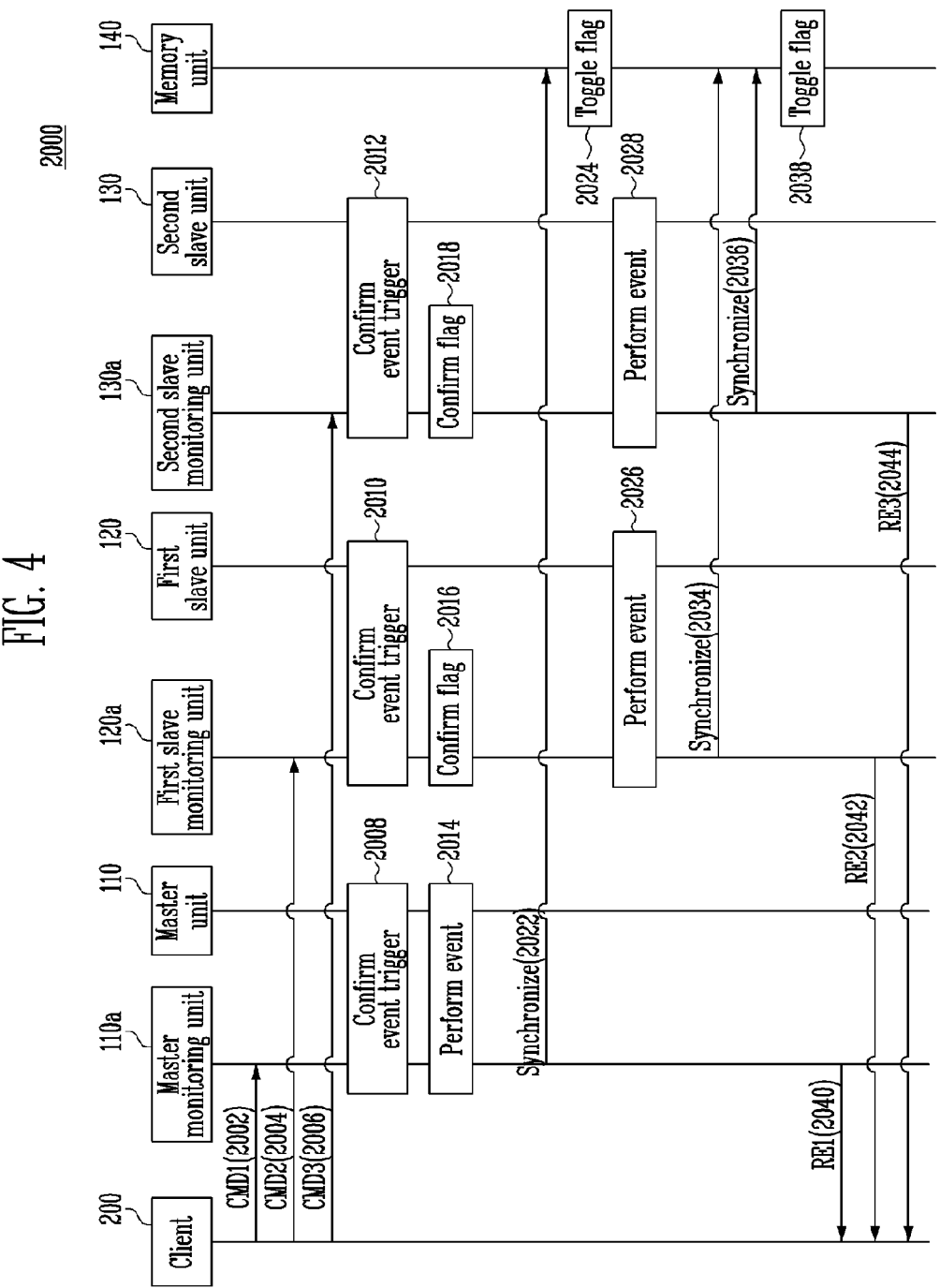
FIG. 4 is an interconnection diagram illustrating an interconnection method of duplex modules and a client in the airplane system according to an exemplary embodiment of the present invention.

FIG. 4 is an interconnection diagram illustrating an interconnection method of the duplex modules of the computer device and the client in the airplane system according to an exemplary embodiment of the present invention. FIG. 4 illustrates a method of performing, by the duplex modules 110, 120, and 130, the monitoring operation based on the ARINC-653 standard and a synchronization method thereof The client 200 transmits the monitoring commands CMD1, CMD2, and CMD3 to the duplex modules 110, 120, and 130 to start the monitoring operation. In this case, the transmitted monitoring commands CMD1, CMD2, and CMD3 are received by the monitoring units 110a, 120a, and 130a of the duplex modules 110, 120, and 130, respectively (2002, 2004, and 2006).

The monitoring units 110a, 120a, and 130a receiving the monitoring command confirm an event trigger for the monitoring operation from each of the duplex modules 110, 120, and 130 (2008, 2010, 2012). Further, when it is confirmed that the trigger is in an on-state, the master monitoring unit 110a first performs the event operation, here, the monitoring operation, for the master unit 110 (2014). In this case, the performed monitoring operation may be the monitoring operation, or one or more of the detailed operations of the monitoring operation described in connection with FIG. 3. The first slave monitoring unit 120a and the second slave monitoring unit 130a confirm a synchronization flag of the memory unit 140 while the master monitoring unit 110a performs the monitoring operation (2016 and 2018). The synchronization flag is a value toggled after the monitoring operation of the master monitoring unit 110a is completed, and the first slave monitoring unit 120a and the second slave monitoring unit 130a periodically confirm the values until the synchronization flag is toggled.

When the monitoring operation of the master monitoring unit 110a is completed, the master monitoring unit 110a transmits a synchronization request to the memory unit 140 (2022). When the synchronization request is transmitted to the memory unit 140, the memory unit 140 toggles a value of the synchronization flag stored therein (for example, the value of the synchronization flag is toggled from "FALSE" to "TRUE") (2024).

As an exemplary embodiment, the synchronization request of the master monitoring unit 110a may toggle the values of two or more synchronization flags of the memory unit 140. In this case, one of the synchronization flags is the synchronization flag referred by the first slave monitoring unit 120a, and the other one of the synchronization flags is the synchronization flag referred by the second slave monitoring unit 130a.

When the synchronization flag is toggled, the first slave monitoring unit 120a and the second slave monitoring unit 130a confirm whether the synchronization flag is toggled, and perform the monitoring operation for each of the first slave unit 120 and the second slave unit 130 (2026 and 2028). After the monitoring operation is completed, each of the first slave monitoring unit 120a and the second slave monitoring unit 130a transmits the synchronization request to the memory unit 140 (2034 and 2036). The memory unit 140 toggles the synchronization flag again in response to the received synchronization requests (2038). As an exemplary example, the synchronization requests of the first slave monitoring unit 120a and the second slave monitoring unit 130a may toggle two or more different synchronization flags of the memory unit 140. In this case, one of the toggled synchronization flags is the synchronization flag referred by the first slave monitoring unit 120a in operation 2016, and the other one of the toggled synchronization flags is the synchronization flag referred by the second slave monitoring unit 130a in operation 2018.

Further, the master unit 110, the first slave unit 120, and the second slave unit 130 return the result of the monitoring operation to the client 200 as the response signal RE1, RE2, and RE3, respectively (2040, 2042, and 2044). In this case, the response signals RE1, RE2, and RE3 may be returned to the client 200 by the master unit 110, and the NA (for example, 111b of FIG. 3) and the NA (for example, 111 c of FIG. 3) of the first slave unit 120 and the second slave unit 130.

Figure 5:
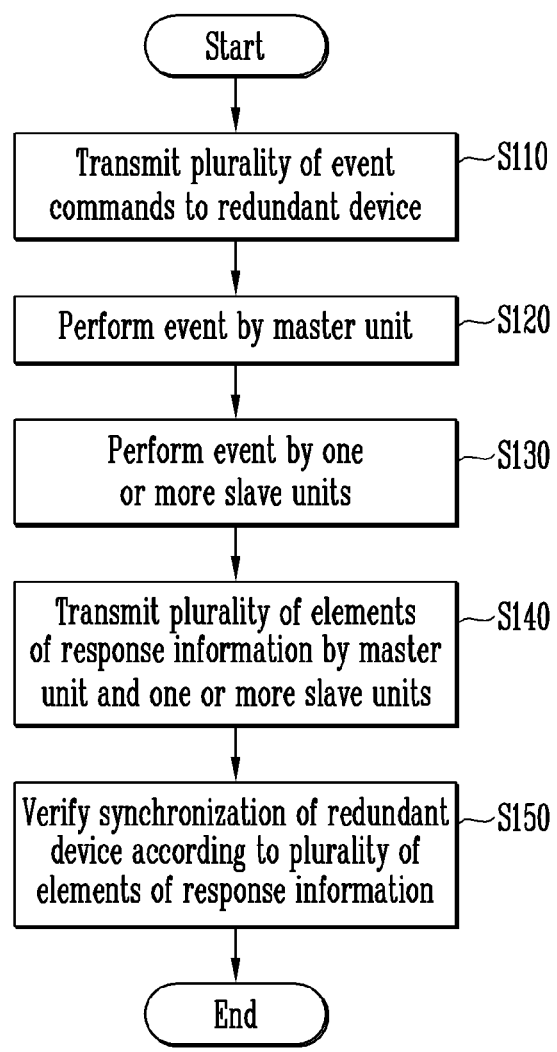
FIG. 5 is a flowchart illustrating an example of a control method of an airplane system configured in a duplex system according to an exemplary embodiment of the present invention.

FIG. 5 is a flowchart illustrating an example of a control method of an airplane system configured in a duplex system according to an exemplary embodiment of the present invention. Referring to FIG. 5, the control method of the computer device includes operation S110 to operation S150.

In operation S110, the client 200 (see FIG. 2) transmits a plurality of event commands to the plurality of duplex modules (redundant devices). In this case, the transmitted event command may be a monitoring command or a debugging command.

The plurality of event commands is received by the corresponding duplex modules, respectively. As an exemplary embodiment, the plurality of duplex modules includes the mater unit 110 (see FIG. 1) and one or more slave units 120 and 130 (see FIG. 2).

In operation S120, an event according to the event commands is performed by the master unit 110 among the plurality of duplex modules. When the master unit 110 completes the event, the master unit 110 transmits a synchronization request for changing a value of a synchronization flag to the memory unit 140 (see FIG. 2). The memory unit 140 toggles the value of the synchronization flag in response to the synchronization request.

In operation S130, one or more slave units 120 and 130 confirm the toggle of the synchronization flag, and perform the events according to the received event commands. When the one or more slave units 120 and 130 complete the event, the one or more slave units 120 and 130 transmit the synchronization request for changing the value of the synchronization flag again to the memory unit 140. The memory unit 140 toggles the value of the synchronization flag again in response to the synchronization request.

In operation S 140, the duplex modules including the master unit 110, and the one or more slave units 120 and 130 returns the respective responds signals (or response information) to the client 200. In this case, the response signal may be a packet including data indicating results of the monitoring performed by the master unit 110 and the one or more slave units 120 and 130.

In operation S150, the client 200 verifies the synchronization or errors of the duplex modules according to the plurality of received response signals. For example, when the response signals have the same value, the client 200 determines that the duplex modules 110, 120, and 130 are normally synchronized. By contrast, when the response signals have different values, the client 200 determines that the duplex modules 110, 120, and 130 are abnormally synchronized or the duplex modules 110, 120, and 130 have a specific problem.

According to the aforementioned configuration, the monitoring method and the debugging method optimized to the airplane system configured in the duplex system are provided. Further, the synchronization between the duplex modules may be effectively performed, and an erroneous operation of each of the duplex modules may be effectively discriminated during the monitoring or the debugging of the airplane system. Further, it is possible to improve reliability and stability of the airplane system by effectively supporting the duplex system of the airplane.

Figure 6:
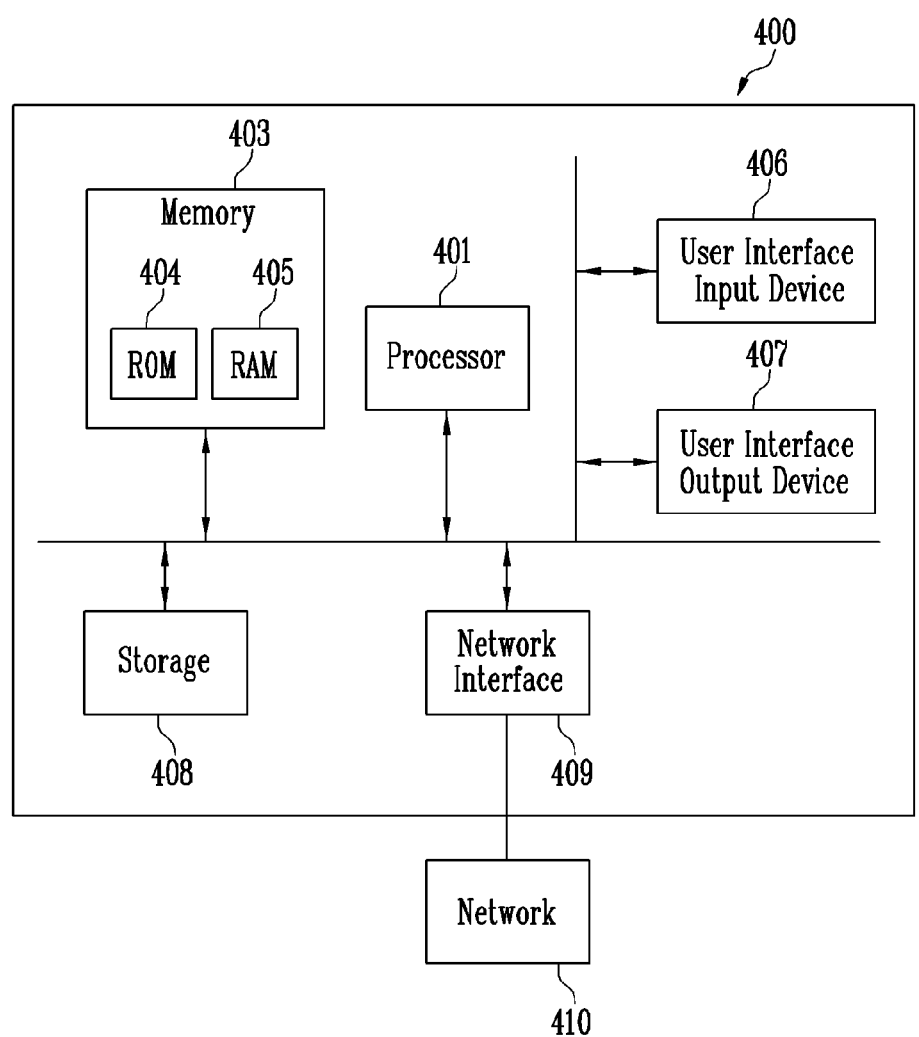
FIG. 6 is a block diagram illustrating an example of an apparatus to which an embodiment of the present invention may be applied.

An embodiment of the present invention may be implemented in a computer system, e.g., as a computer readable medium. As shown in FIG. 6, a computer system 400 may include one or more of a processor 401, a memory 403, a user input device 406, a user output device 407, and a storage 408, each of which communicates through a bus 402. The computer system 400 may also include a network interface 409 that is coupled to a network 410. The processor 401 may be a central processing unit (CPU) or a semiconductor device that executes processing instructions stored in the memory 403 and/or the storage 408. The memory 403 and the storage 408 may include various forms of volatile or non-volatile storage media. For example, the memory may include a read-only memory (ROM) 404 and a random access memory (RAM) 405.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. A method of controlling an airplane system, comprising:
   receiving, by each of a plurality of duplex modules, a corresponding event command from a client;
   performing, by a first module among the plurality of duplex modules, a first event specified by the event command in response to the event command;
   performing, by a second module different from the first module among the plurality of duplex modules, a second event specified by the event command after the first event is completed; and
   transmitting, by the first and second modules, a first response signal indicating a result of the performance of the first event and a second response signal indicating a result of the performance of the second event to the client,
   wherein the client compares the first response signal and the second response signal, and determines whether the plurality of duplex modules is synchronized or has an error,
   wherein the method further comprises providing, by the first module, a synchronization request to a memory unit after the first event is performed so that the memory unit toggles or changes a value of a flag stored therein in response to the synchronization request provided by the first module,
   wherein the performing of the second event includes performing the second event in response to the toggle or the change of the value of the flag from the memory unit,
   wherein the performing further comprises providing, by the second module, another synchronization request discriminated from the synchronization request provided by the first module to the memory unit after the second event is performed, and
   wherein the memory unit toggles or changes the value of the flag stored in the memory unit again in response to the synchronization request provided by the second module.

2. The method of claim 1, wherein the first module is a master module first operated among the plurality of duplex modules, and
   the second module is a slave module replacing the first module when the first module has failure.

3. The method of claim 1, wherein the first event is a monitoring operation or a debugging operation performed by the first module, and
   the second event is a monitoring operation or a debugging operation performed by the second module.

4. The method of claim 1, wherein the event command is transmitted to each of the plurality of duplex modules in a form of a packet.

5. The method of claim 1, wherein the first response signal and the second response signal are transmitted to the client in a form of a packet.

6. The method of claim 1, wherein the event command includes an identifier for the corresponding duplex module.

7. The method of claim 6, wherein the identifier is included in the first response signal or the second response signal to be transmitted to the client.

8. An airplane system, comprising:
   a client;
   a memory unit;
   a first module configured to receive a first event command from the client, perform a first event in response to the first event command, transmit a result of the performance of the first event to the client as a first response signal, and provide a synchronization request to the memory unit after the first event is performed; and
   a second module configured to receive a second event command from the client, perform a second event in response to the second event command, and transmit a result of the performance of the second event to the client as a second response signal, wherein the client compares the first response signal and the second response signal, and determines whether the first module and the second module are synchronized or have errors, wherein the memory unit toggles or changes a value of a synchronization flag stored therein in response to the synchronization request provided by the first module, wherein the second module provides another synchronization request discriminated from the synchronization request provided by the first module to the memory unit after the second event is performed, and wherein the memory unit toggles or changes the value of the synchronization flag stored therein again in response to the synchronization request provided by the second module.

9. The airplane system of claim 8, wherein the second module performs the second event in response to the toggle or the change of the synchronization flag.

* * * * *